(12) United States Patent
Little et al.

(10) Patent No.: US 7,388,731 B1
(45) Date of Patent: Jun. 17, 2008

(54) HARD DISK DRIVE RECIRCULATION AIR FILTER

(75) Inventors: Aaron D. Little, Campbell, CA (US); Joshua P. Weiher, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 399 days.

(21) Appl. No.: 11/269,998

(22) Filed: Nov. 9, 2005

(51) Int. Cl.
*G11B 33/14* (2006.01)

(52) U.S. Cl. .................................... 360/97.02

(58) Field of Classification Search ............ 360/97.02, 360/264.2, 264.3
See application file for complete search history.

(56) References Cited

U.S. PATENT DOCUMENTS

| | | | | |
|---|---|---|---|---|
| 4,863,499 A | * | 9/1989 | Osendorf | .................... 96/134 |
| 6,266,208 B1 | * | 7/2001 | Voights | .................... 360/97.02 |
| 6,507,452 B1 | * | 1/2003 | Bae et al. | ................ 360/97.02 |
| 7,082,012 B2 | * | 7/2006 | Macpherson et al. | .... 360/97.02 |
| 7,291,208 B2 | * | 11/2007 | Dauber et al. | ................ 96/134 |
| 7,306,659 B2 | * | 12/2007 | Gorton et al. | ................ 96/134 |

\* cited by examiner

*Primary Examiner*—Allen Cao
(74) *Attorney, Agent, or Firm*—Crowell & Moring LLP

(57) ABSTRACT

A hard disk drive recirculation filter is disposed on a housing surface of a disk drive assembly oriented adjacent to one or more disk surfaces. In one embodiment, the recirculation filter is a pocket filter having a filter support component and a filter element. The filter support includes an inlet, a top surface and a bottom surface, where the bottom surface is used to adhere the pocket filter to the housing surface. The top surface is adapted to adhere the filter element thereto, thereby forming a pocket into which rotationally-induced airflow may enter.

33 Claims, 6 Drawing Sheets

HARD DISK DRIVE RECIRCULATION AIR FILTER

FIELD OF THE INVENTION

The invention relates in general to data storage systems such as disk drives, and in particular to air filters disposed within such storage systems.

BACKGROUND OF THE INVENTION

There can be various types of filters in a data storage systems, such as hard disk drives (HDD), at any one time. For example, recirculation filters may be found in the path of airflow caused by the spinning motion of the media. Such recirculation filters are designed to filter out particles which become airborne during the operation of the drive. Breather filters are located on the cover or base casting and are designed to allow for pressure equalization in the drive, without the introduction of particulate contamination. Another type of filter is an organic adsorption filter which is used to reduce organic vapors or reactive gases that might enter the drive or condense on the media or sliders within the drive. There are also desiccant containing filters to lower the relative humidity within the data storage system.

Data storage system, including HDDs, are increasingly being manufactured with smaller form factors and increased storage capacities. This fact places an even greater premium on space within the HDD. Critical components of an HDD requiring such space include the aforementioned recirculation and adsorption filters. Recirculation filters are a particularly important component of the HDD since particulate matter on disk's surface can significantly interfere with the operation of the HDD's read/write head. As the disk spins, airflow tends to move particles between the read/write head and the disk surface, thereby resulting in possible component damage or read/write errors.

Given the space constraints within the HDD, it has become increasingly necessary to produce a recirculation and/or adsorption filter having a very small form factor. In addition, the now-higher storage capacities of HDDs require higher filtration efficiencies since even the smallest particles can disrupt the HDD's operation. Finally, there is a constant need to minimize cost and maintain ease of assembly for all HDD components. Thus, there is a need for an improved HDD recirculation filter which satisfies one or more of the aforementioned needs.

SUMMARY OF THE INVENTION

A disk drive recirculation air filter is disclosed and claimed. In one embodiment, a disk drive includes a disk drive housing having a housing surface, at least one rotatable disk having a disk surface, and a pocket filter disposed on the housing surface adjacent the disk surface. In one embodiment, the pocket filter includes a filter support having an inlet, a top surface and a bottom surface, where the bottom surface is adhered to the housing surface. The pocket filter further includes a filter element attached to the top surface, where the filter element is oriented approximately parallel to the housing surface.

Other embodiments are disclosed and claimed herein.

DETAILED DESCRIPTION OF THE EXEMPLARY EMBODIMENTS

According to one aspect of the invention, a recirculation filter is disposed on a housing surface of a disk drive assembly and oriented adjacent to one or more disk surfaces. In one embodiment, the recirculation filter is a pocket filter having a filter support component and a filter element. The filter support may include an inlet, a top surface and a bottom surface, where the bottom surface is used to adhere the pocket filter to the housing surface. The top surface may be adapted to adhere the filter element thereto, thereby forming a pocket into which rotationally-induced airflow may enter.

Another aspect of the invention is to provide a pocket filter in which the filtering media is electrostatic. In this case, pocket filter may be used to filter rotationally-induced airflow that both enters the pocket filter and that flows adjacent to, but not necessarily through, the filtering media. The pocket filter has an effective surface area defined by a major side of the filtering media which, in one embodiment, is oriented approximately parallel to a housing surface to which the pocket filter is attached. The housing surface to which the recirculation filter is attached may be a baseplate or cover plate of the disk drive. In another embodiment, the housing surface may be a side surface oriented approximately parallel to an axis of rotation of the rotating disks. The pocket filter can also have a surface, such as the top surface, that includes an adsorptive material, such as carbon, for adsorbing organic vapors or reactive gases.

Still another aspect of the invention is to use a raised stator shield to help direct airflow towards an opening of the pocket filter.

Figure 1:
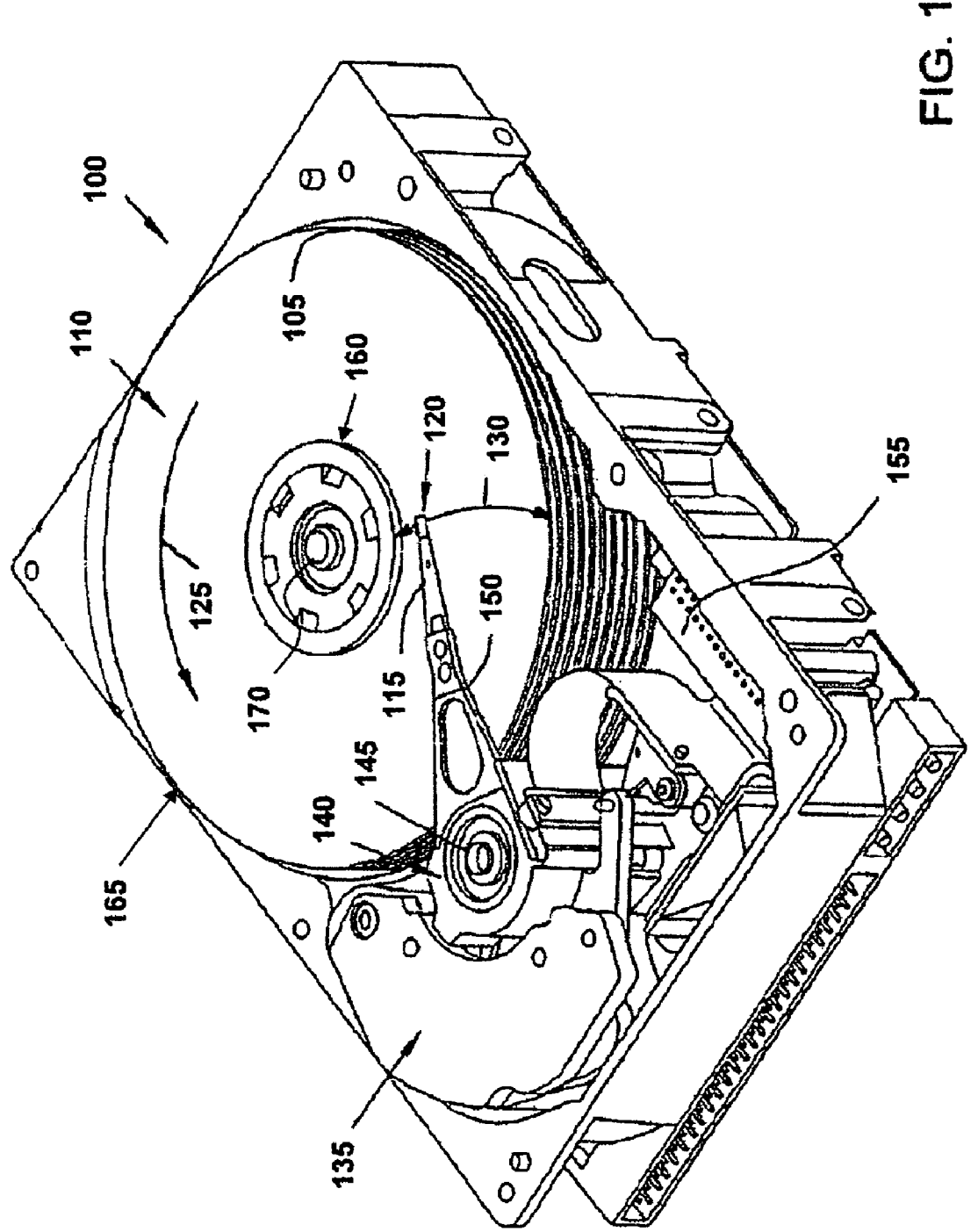
FIG. 1 is a perspective view of a data storage device consistent with one embodiment of the invention.

FIG. 1 illustrates a disk drive storage device 100 capable of implementing one embodiment of the invention. Disk drive 100 includes a disk pack 105 having one or more disks, each of which have storage surfaces 110 comprised of a magnetic material or optically-readable material. Each disk in the disc pack 105 is accessible by a head stack assembly 115 that includes a slider 120 and a read/write head. A spindle motor drives rotation of the disks in the disk pack 105 in the direction shown by arrow 125. As the disks are rotated, the head stack assembly 115 accesses different locations on the storage surfaces 110 of the disks. The head stack assembly 115 is actuated for radial movement relative to the disk surfaces 110, such as in a direction indicated by arrow 130, in order to access the different tracks (or radial positions) on the disk surfaces 110. Such actuation of the head stack assembly 115 is provided by a servo system that typically includes a voice coil motor (VCM) 135, which includes a rotor 140 that pivots on axis 145. Energizing a coil of the rotor 140 with an electric current in one polarity or the reverse polarity causes the head stack assembly 115 to rotate about the axis 145. VCM 135 also includes an arm 150 that supports the head stack assembly 115. Disk drive 100 further includes control circuitry 155 for controlling operation of disk drive 100 and for transferring data to and from the disk drive 100.

As previously mentioned, disk pack 105 may contain one or more disks that have disk surfaces 110. The disk surfaces 110 extend from a central hub 160 to an outer disk edge 165. The disk pack 105 rotate about a central axis 170 as indicated by arrow 125. This rotation induces airflow that typically contains particulate matter that, left unfiltered, would significantly interfere with the operation of the disk drive 100.

Figure 2A:
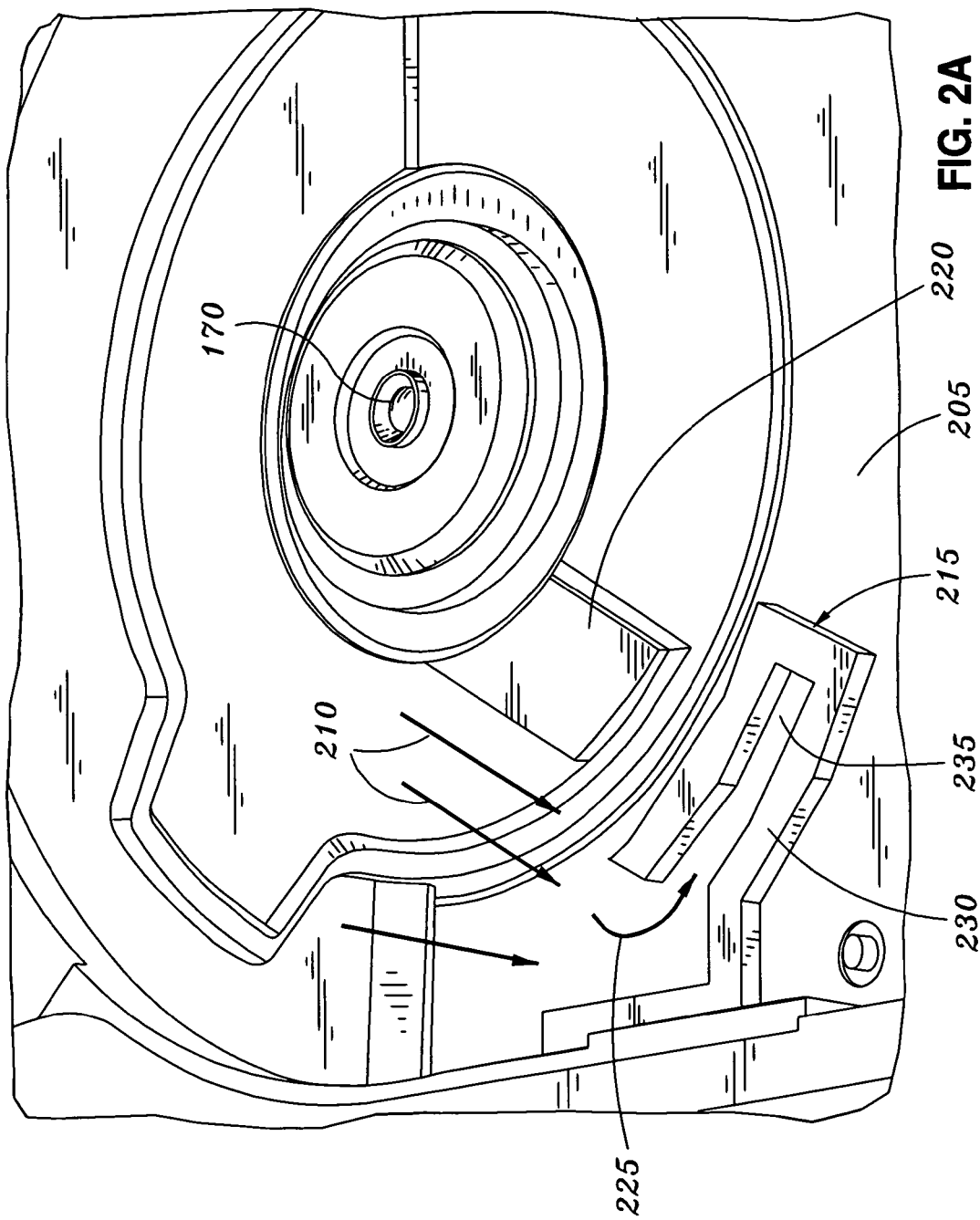
FIGS. 2A-2D are cross-sectional views depicting a recirculation filter attached to a baseplate of a hard disk drive consistent with one or more embodiments of the invention.

Referring now to FIG. 2A, depicted is a cross-sectional view of a disassembled embodiment of disk drive 100 in which the disk pack 105, VCM 135, head stack assembly 115 and various other internal components have been removed to clearly show the disk drive's baseplate 205. As previously mentioned, rotation about central axis 170 results in airflow, depicted in FIG. 2A as airflow 210. For this reason, a recirculation filter consistent with the invention may be placed on the baseplate 205 beneath and adjacent to a surface of one of the disks comprising the disk pack 105 (not shown). To that end, in one embodiment filter support 215 is placed adjacent to and below where the disk pack 105 will be located in a fully assembled disk drive device. While in the embodiment of FIG. 2A the filter support is located adjacent to what will be disk edge 165 when assembled, it may similarly be located closer to the axis 170 about which the disk(s) rotate.

In accordance with one embodiment of the invention, filter support 215 and an attached filter element (not shown) comprise a recirculation filter for airflow 210 which is adhered to baseplate 205. In one embodiment, filter support 215 has one inlet 225 forming a "pocket" into which airflow 210 may flow. The filter support 215 further includes a bottom surface (not shown) used to adhere the filter support 215 to the baseplate 205. While any adhesive may be used to adhere the filter support 215 to the baseplate 205, in one embodiment a pressure-sensitive adhesive (PSA) may be used, such as the PSAs manufactured and sold by John Deal Coatings Inc. of Mt. Juliet, Tenn.

Continuing to refer to FIG. 2A, filter support further includes a top surface 230 which is oriented approximately parallel to the baseplate 205. The top surface 230 is usable to attach a filter element (see FIGS. 2B-2C) to the filter support 215. As with the bottom surface's attachment to the baseplate 215, a similar adhesive may be used to adhesively bond a filter element to the top surface 230. In addition, while the top surface 230 may be oriented approximately parallel to the baseplate 205, in another embodiment it may similarly be oriented to be within 40 degrees of being perfectly parallel to the baseplate 205.

FIG. 2A depicts the filter support 215 in a C-channel or pocket configuration. However, the filter support may have numerous other configurations so long as an inlet 225 allows airflow 210 to enter the recirculation filter. Moreover, the height of the filter support 215, as measured from the bottom surface (which is attached to the baseplate 205) to the top surface 230 may range from 0.2 mm to 1.5 mm. In another embodiment, the overall thickness of the recirculation filter may be between 50% and 90% of the disk-to-base clearance. In the embodiment of FIG. 2A, the filter support 215 is approximately 10 mm by 3.4 mm, although it should be appreciated that numerous other configurations and/or dimensions for the filter support 215 are also possible and consistent with the principles of the invention. Since the filter support 215 may have numerous configurations other than a pocket configuration, as shown in FIG. 2A, it may be more generally useful to describe the footprint dimensions of the filter support rather than the length and width thereof. To that end, the footprint of the filter support 215 is defined as the total area of the disk drive housing surface (i.e., the baseplate 205 in this embodiment) occupied by the filter support 215. The footprint of the filter support 215 is based at least in part on the form factor of the disk drive 100. Where disk drive 100 is a 1-inch drive, the footprint of some embodiments of the filter support 215 preferably ranges from approximately 10 mm$^2$ to 50 mm$^2$. Similarly, disk drive 100 may also have other form factors (e.g., 1.8-inch, 2.5-inch, 3.5-inch, etc.), in which cases the footprint of some embodiments of the filter support 215 may preferably be correspondingly larger (e.g., 500 mm$^2$). Moreover, the channel footprint 235 of the filter support 215 may be between 10% and 90% of the total footprint, where the channel footprint 235 is defined as the total area within the filter support 215 capable of receiving the airflow 210.

It should further be appreciated that filter support 215 may be comprised of a mylar plastic material, a foam material, an adhesive stack up, a filtration media (such as the material usable for the filter element portion of the pocket filter), or any other material capable of supporting a filter element and adhering thereto.

While in the embodiment of FIG. 2A a raised stator shield 220 is used to help direct airflow 210 towards an inlet 225 of filter support 215, it should equally be appreciated that airflow 210 will naturally be directed towards such an inlet due to the centrifugal and tangential forces acting upon such airflow 210 due to the rotating disk(s) (not shown), even ion the absence of raised stator shield 220.

Figure 2B:
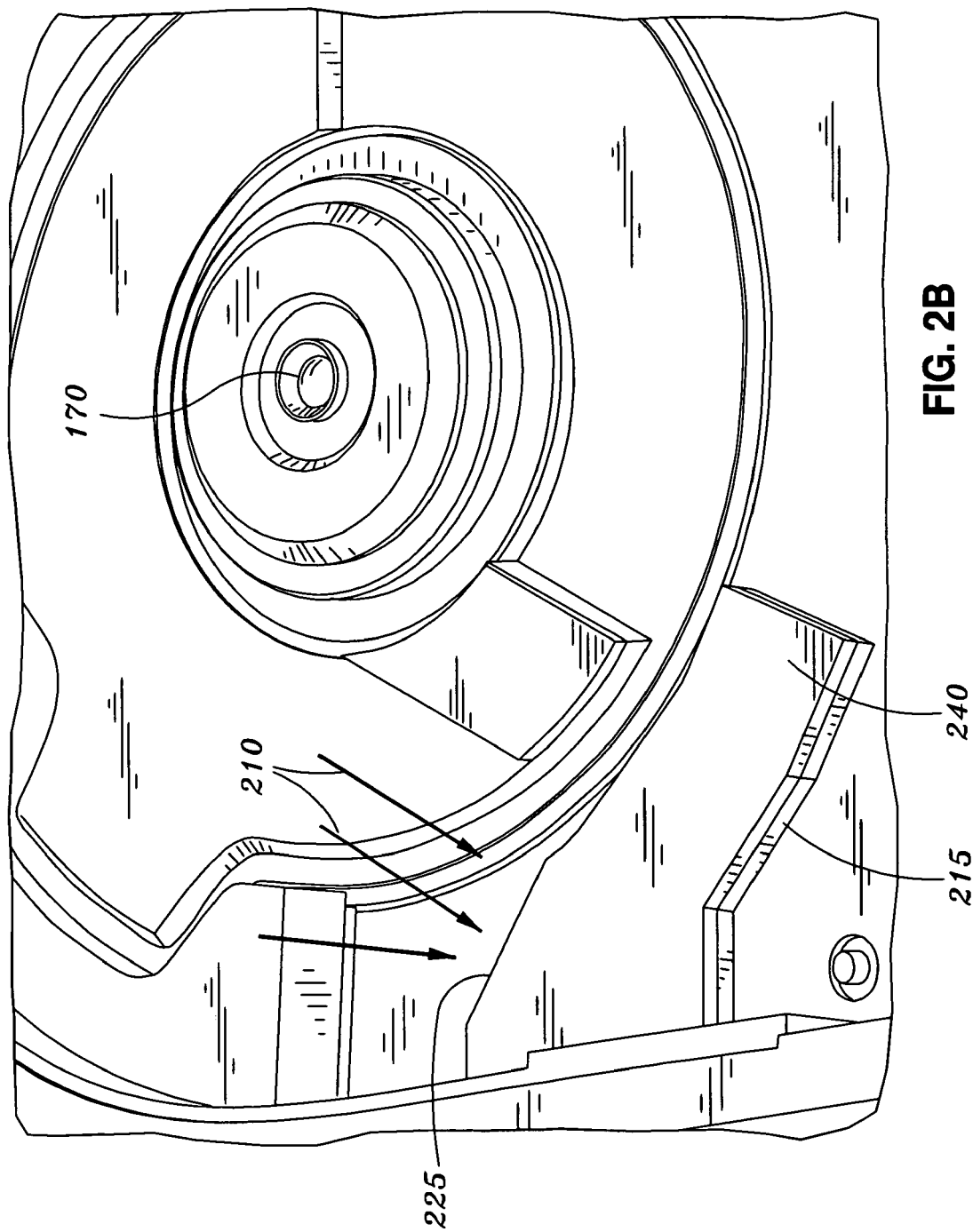

Referring now to FIG. 2B, depicted is the disassembled disk drive 100 of FIG. 2A in which filter element 240 has been adhered to or otherwise attached to the filter support 215. In some embodiments, the filter element 240 may have a height or thickness ranging from approximately 0.1 mm to 1.0 mm. In this embodiment, airflow 210 is shown entering inlet 225 of the now enclosed pocket recirculation filter comprised of the filter support 215 and the filter element 240. As with the top surface of the filter support 215 to which the filter element is attached 240, the filter element 240 has a major surface which is oriented approximately parallel to the disk drive housing surface (i.e., baseplate 205) to which the pocket filter is attached. Similarly, the filter element 240 may be oriented to be within 40 degrees of being perfectly parallel to the baseplate 205.

In one embodiment, filter element 240 may be comprised of an electrostatic filtration media, such as the filtration media produced and sold by Donaldson Company, Inc. The surface area of the filter element 240, which is the major surface oriented approximately parallel to the baseplate 205, may be between 10 mm$^2$ and 50 mm$^2$, when the form factor of disk drive 100 is a 1-inch drive. Alternatively, the surface area of the major surface of the filter element 240 may be larger when drive 100 has another form factor (e.g., 1.8-inch, 2.5-inch, 3.5-inch, etc.).

Figure 2C:
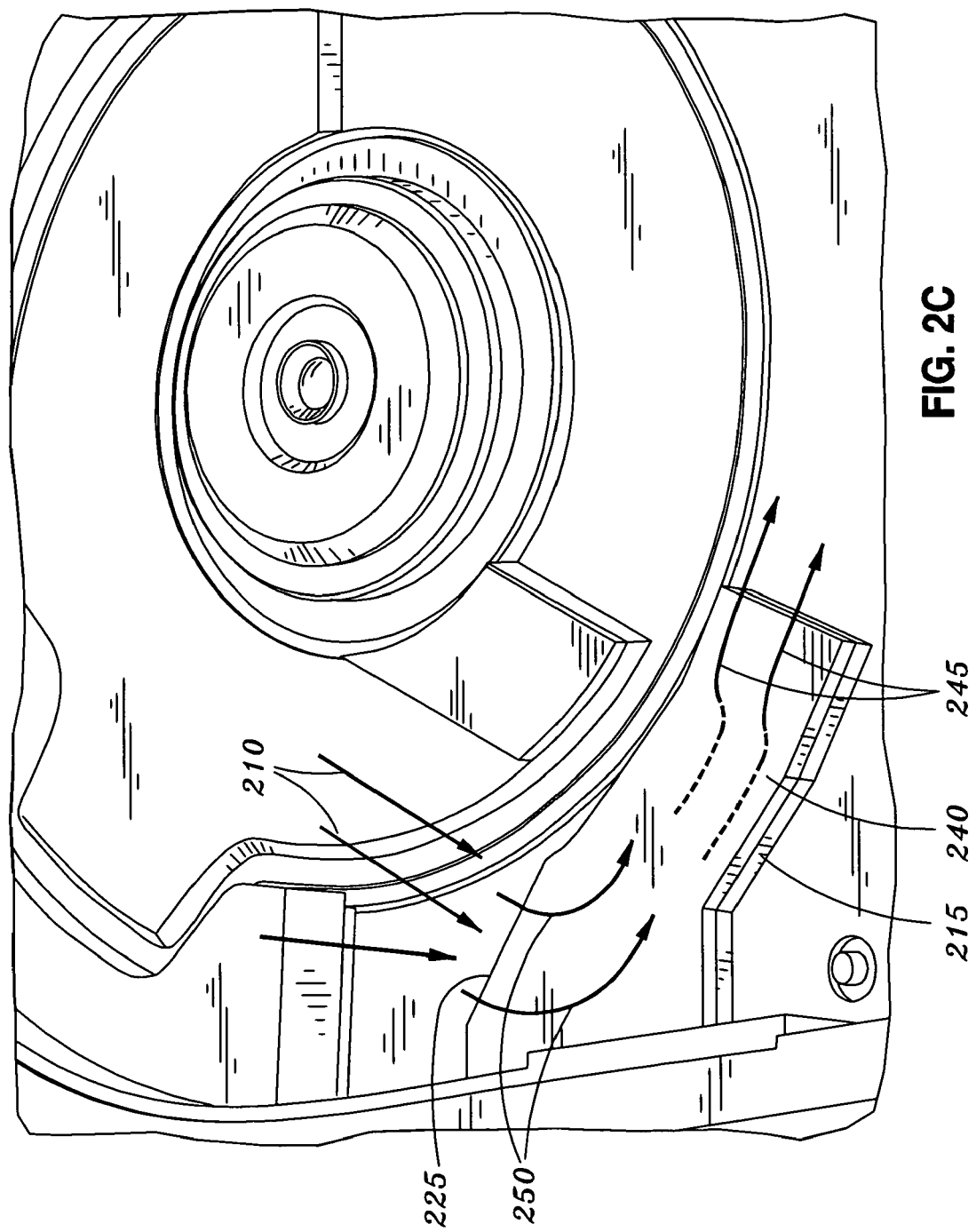

Referring now to FIG. 2C, depicted is the recirculation filter embodiment of FIG. 2B illustrating filtered airflows 245 and 250. In particular, radial airflow 210 may enter inlet 225 passing through the pocket of the recirculation filter and exiting through the filter element 240 as filtered air 245. In addition, in the embodiment where the filter element 240 is comprised of an electrostatic material, a portion of airflow 210 may flow adjacent to, but not through, the filter element producing filtered air 250, as shown in FIG. 2C.

Figure 2D:
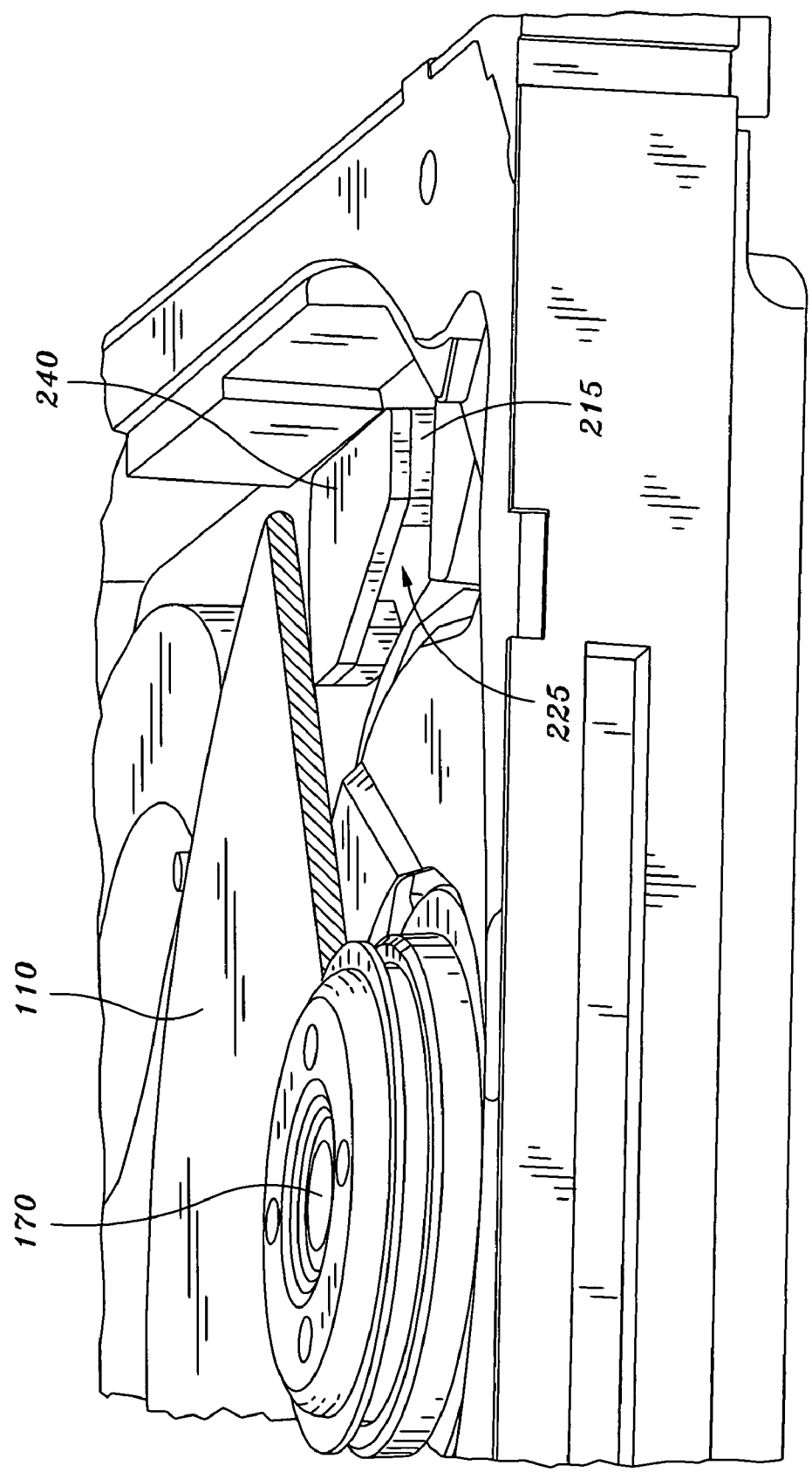

FIG. 2D depicts another embodiment of the recirculation filter oriented beneath and adjacent to a disk surface 110. As with the previous filter embodiments, the embodiment of FIG. 2D depicts the pocket recirculation filter being comprised of the filter support 215 and the filter element 240, where the filter support is attached to a baseplate.

Figure 3:
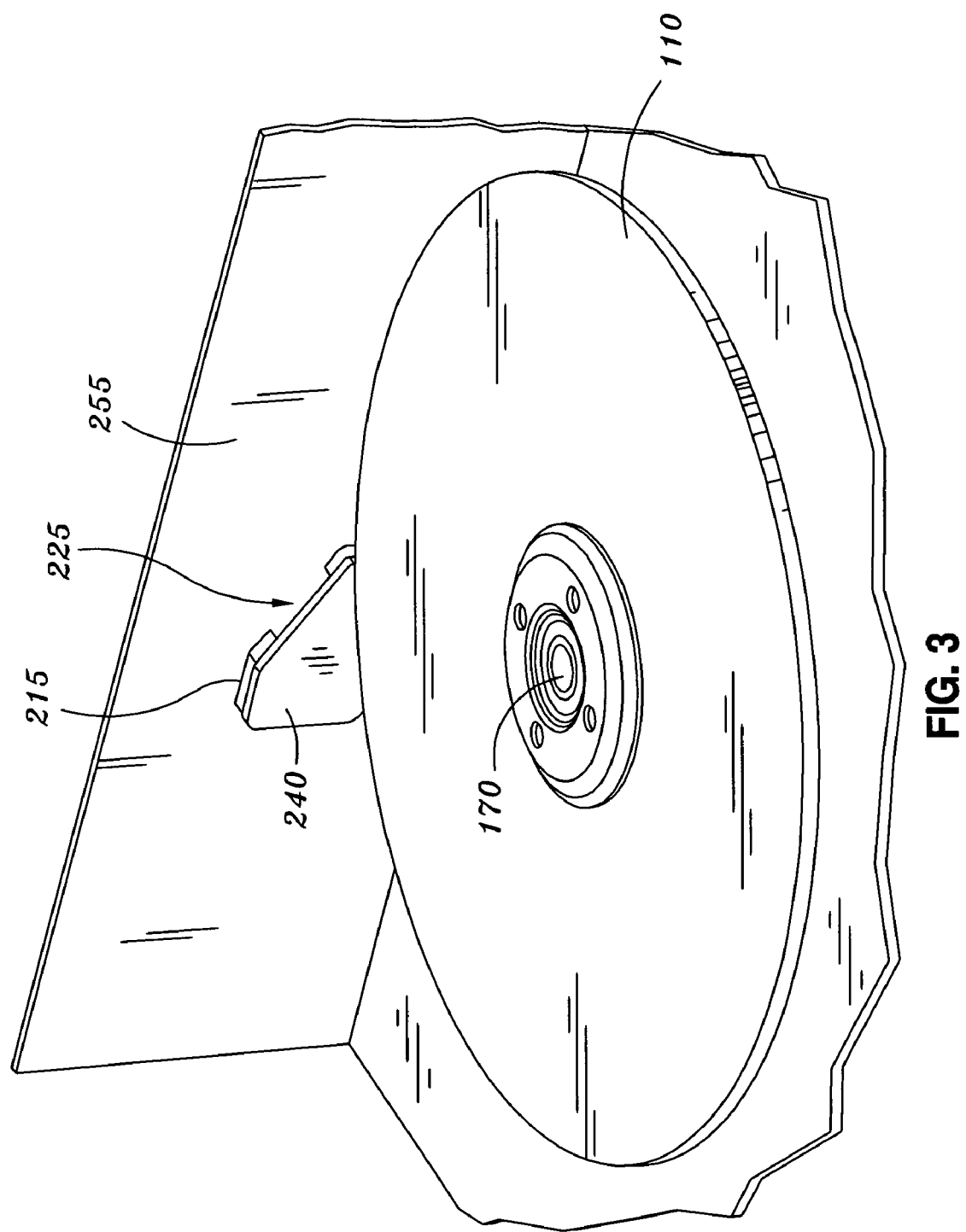
FIG. 3 is a cross-sectional view depicting a recirculation filter attached to a side surface of a hard disk drive.

As previously mentioned, in other embodiments of the pocket filter may be attached or otherwise affixed to disk drive housing surfaces other than the baseplate. For example, the filter support 215 of the pocket filter may similarly be adhered to the inside of a cover plate of the disk drive 100 or to a side housing surface. To that end FIG. 3, depicted is a cross-sectional view of the disk drive 100 in which the recirculation filter (comprised of a filter support 215 and a filter element 240) has been attached to a side housing surface 255 of the disk drive 100. In particular, filter support 215 is attached to the side housing surface 255 and oriented adjacent to but separated from disk surface 110. Inlet 225 is further oriented to receive rotationally-induced airflow resulting from the rotation of the disk 110 around axis 170.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

The invention claimed is:

1. A disk drive comprising:
   a disk drive housing having a housing surface;
   at least one rotatable disk having a disk surface; and
   a pocket filter disposed on the housing surface adjacent the disk surface, wherein said pocket filter includes,
      a filter support having an inlet, a top surface and a bottom surface, wherein said bottom surface is adhered to said housing surface, and
      a filter element attached to said top surface, and being oriented approximately parallel to said housing surface.

2. The disk drive of claim 1, wherein said housing surface is a surface of a baseplate, and wherein said filter is attached to said baseplate and disposed below said disk surface.

3. The disk drive of claim 2, wherein said baseplate includes a raised stator shield disposed below said rotatable disk drive and adjacent to said filter.

4. The disk drive of claim 1, wherein said housing surface is a surface of a cover, and wherein said filter is attached to said cover and disposed above said disk surface.

5. The disk drive of claim 1, wherein said housing surface is a side surface oriented parallel to an axis of rotation of the disk, wherein the disk surface is a disk edge surface.

6. The disk drive of claim 1, wherein said filter element is made of an electrostatic material.

7. The disk drive of claim 1, wherein said top surface further includes an adhesive adhering said filter element to said top surface.

8. The disk drive of claim 1, wherein said bottom surface further includes an adhesive adhering said filter support to said housing surface.

9. The disk drive of claim 1, wherein said filter element has a surface area of between about 10 mm$^2$ and about 50 mm$^2$.

10. The disk drive of claim 1, wherein said filter support is made of a material selected from a list consisting of mylar plastic, foam, adhesive stack up, and filtration media.

11. The disk drive of claim 1, wherein said filter element is adhesively bonded to said top surface.

12. The disk drive of claim 1, wherein said filter element has a major surface that is oriented to be within 40 degrees of being perfectly parallel to the housing surface.

13. A disk drive comprising:
    a disk drive housing surface;
    at least one rotatable disk having a disk surface; and
    a filter disposed on the housing surface adjacent the disk surface, wherein the filter includes an inlet, a top surface adapted to adhere to a filtering element, and a bottom surface adapted to adhere to the housing surface, and wherein said top surface and bottom surface are oriented approximately parallel to said housing surface.

14. The disk drive of claim 13, wherein said housing surface is a surface of a baseplate, and wherein said filter is attached to said baseplate and disposed below said disk surface.

15. The disk drive of claim 14, wherein said baseplate includes a raised stator shield disposed below said rotatable disk drive and adjacent to said filter.

16. The disk drive of claim 13, wherein said housing surface is a surface of a cover, and wherein said filter is attached to said cover and disposed above said disk surface.

17. The disk drive of claim 13, wherein said housing surface is a side surface oriented parallel to an axis of rotation of the disk, wherein the disk surface is a disk edge surface.

18. The disk drive of claim 13, wherein said filtering element is made of an electrostatic material.

19. The disk drive of claim 13, wherein said top surface further includes an adhesive adhering said filtering element to said top surface.

20. The disk drive of claim 13, wherein said bottom surface further includes an adhesive adhering said filter to said housing surface.

21. The disk drive of claim 13, wherein said filtering element has an active surface area of between about 10 mm$^2$ and about 50 mm$^2$.

22. The disk drive of claim 13, wherein said filter is made of a material selected from a list consisting of mylar plastic, foam, adhesive stack up, and filtration media.

23. The disk drive of claim 13, wherein said top surface and bottom surface are each oriented to be within 40 degrees of being perfectly parallel to the housing surface.

24. A disk drive comprising:
    a disk drive housing surface;
    at least one rotatable disk having a disk surface; and
    a pocket filter disposed on the housing surface adjacent the disk surface, wherein the filter includes an air inlet, an adhesive surface adapted to adhere to the housing surface, and a filtering surface, wherein said adhesive surface and filtering surface are oriented approximately parallel to said housing surface.

25. The disk drive of claim 24, wherein said housing surface is a surface of a baseplate, and wherein said pocket filter is attached to said baseplate and disposed below said disk surface.

26. The disk drive of claim 25, wherein said baseplate includes a raised stator shield disposed below said rotatable disk drive and adjacent to said pocket filter.

27. The disk drive of claim 24, wherein said housing surface is a surface of a cover, and wherein said pocket filter is attached to said cover and disposed above said disk surface.

28. The disk drive of claim 24, wherein said housing surface is a side surface oriented parallel to an axis of rotation of the disk, wherein the disk surface is a disk edge surface.

29. The disk drive of claim 24, wherein said filtering surface is made of an electrostatic material.

30. The disk drive of claim 24, wherein said adhesive surface further includes an adhesive adhering said pocket filter to said housing surface.

31. The disk drive of claim 24, wherein said filtering surface has an active surface area of between about 10 mm$^2$ and about 50 mm$^2$.

32. The disk drive of claim 24, wherein said pocket filter is made of a material selected from a list consisting of mylar plastic, foam, adhesive stack up, and filtration media.

33. The disk drive of claim 24, wherein said adhesive surface and filtering surface are each oriented to be within 40 degrees of being perfectly parallel to the housing surface.

* * * * *